United States Patent [19]

Loewenthal et al.

[11] Patent Number: 5,294,942
[45] Date of Patent: Mar. 15, 1994

[54] NON-IMPACT PRINTER APPARATUS AND METHOD FOR RECORDING ON A MOVING MEDIUM

[75] Inventors: Kenneth H. Loewenthal, Rochester; Steven M. Bryant, Holley; Thomas F. Powers, Webster, all of N.Y.

[73] Assignee: Eastman Kodak Company, Rochester, N.Y.

[21] Appl. No.: 733,478

[22] Filed: Jul. 22, 1991

[51] Int. Cl.$^5$ .............................................. A41J 2/45
[52] U.S. Cl. ................................ 346/107 R; 358/296
[58] Field of Search ............... 346/107 R, 160, 154, 346/136, 1.1; 358/296, 302

[56] References Cited

U.S. PATENT DOCUMENTS

| | | | |
|---|---|---|---|
| 3,952,311 | 4/1976 | Lapeyre | 346/107 R X |
| 4,074,320 | 2/1978 | Kapes, Jr. | 358/302 X |
| 4,367,943 | 1/1983 | Nakamura . | |
| 4,415,913 | 11/1983 | Diddens | 346/154 |
| 4,445,128 | 4/1984 | Dolan et al. | 346/160 |
| 4,475,115 | 10/1984 | Garbe | 346/108 |
| 4,491,399 | 1/1985 | Bell | 346/107 A X |
| 4,504,130 | 2/1985 | Bell et al. | 346/107 A X |
| 4,757,327 | 7/1988 | Henzi | 346/7.1 |
| 4,780,731 | 10/1988 | Creutzmann et al. | 346/108 |
| 4,806,965 | 2/1989 | Yamanouchi et al. | 346/107 R X |
| 4,918,462 | 4/1990 | Tomita et al. | 346/107 R |
| 4,962,385 | 10/1990 | Zlotek | 346/1.1 |
| 5,025,322 | 6/1991 | Ng | 358/302 X |

*Primary Examiner*—Benjamin R. Fuller
*Assistant Examiner*—David Yockey
*Attorney, Agent, or Firm*—Norman Rushefsky

[57] ABSTRACT

A non-impact printer apparatus and method for recording on a medium that is moving at a variable rate. A plurality of recording elements arranged transverse to movement of the medium records respective pixels. Each pixel is formed by enabling each recording element a plurality of times during a pixel recording period. To maintain uniformity in pixel recording a duration for recording a sub-pixel and the number of sub-pixels per pixel are adjusted in accordance with the speed of the recording medium. The sum of the sub-pixel recording durations during a pixel recording period comprises the pixel exposure time.

8 Claims, 2 Drawing Sheets

NON-IMPACT PRINTER APPARATUS AND METHOD FOR RECORDING ON A MOVING MEDIUM

BACKGROUND OF THE INVENTION

1. Field of the Invention

The invention relates to non-impact printer apparatus and methods and, more particularly, to apparatus and methods for recording on a medium that is moving at a variable rate.

2. Description Relative to the Prior Art

In the prior art, non-impact printers are known for recording on a suitable media. Examples of such printers are light-emitting diodes, thermal printers, ink jet printers, etc. Examples of media for recording may be a photoconductor, photographic film, thermal recording paper or plain paper such as for ink jet.

In printers using light-emitting diodes (LED's) printheads to record, a series of LEDs are arranged in a column perpendicular to the direction of travel of the recording medium which say is photographic film. For each line of pixels to be recorded in the main scan direction, i.e., direction perpendicular to direction of film movement, a control signal is developed within the controlling circuitry supporting the printhead to synchronize the recording of this line or column of pixels. Such a control signal may be generated in response to an encoder or perforation sensor or other signal generator device detecting displacement of a fixed amount of movement of the film. In forming images of characters on the film, it is important that the amount of exposure for each pixel be appropriate even though the speed of the medium is changing. It is also important in printing characters to avoid gaps between adjacent lines of pixels in the sub-scanning direction. Such gaps may provide difficulty in reading of images on the film by automatic image readers.

It is, therefore, an object of the invention to provide a non-impact printer apparatus and method that is highly suited for recording with a medium that is moving at a variable rate.

SUMMARY OF THE INVENTION

An apparatus and method for non impact recording on a moving recording medium which provides for driving each of a plurality of respective recording elements for recording a respective pixel by driving each recording element for a series of spaced sub-pixel exposure periods and during an interval comprising a pixel recording period generating a first signal having a value that varies with a speed of movement of the recording medium, and in response to said first signal, generating a first series of signals for driving a recording element for a series of sub-pixel intervals during the pixel recording period with a number and/or durations of sub-pixel recording intervals changing in response to changes in web speed to maintain a predetermined exposure time for recording of each pixel.

DESCRIPTION OF THE PREFERRED EMBODIMENT

Figure 1:
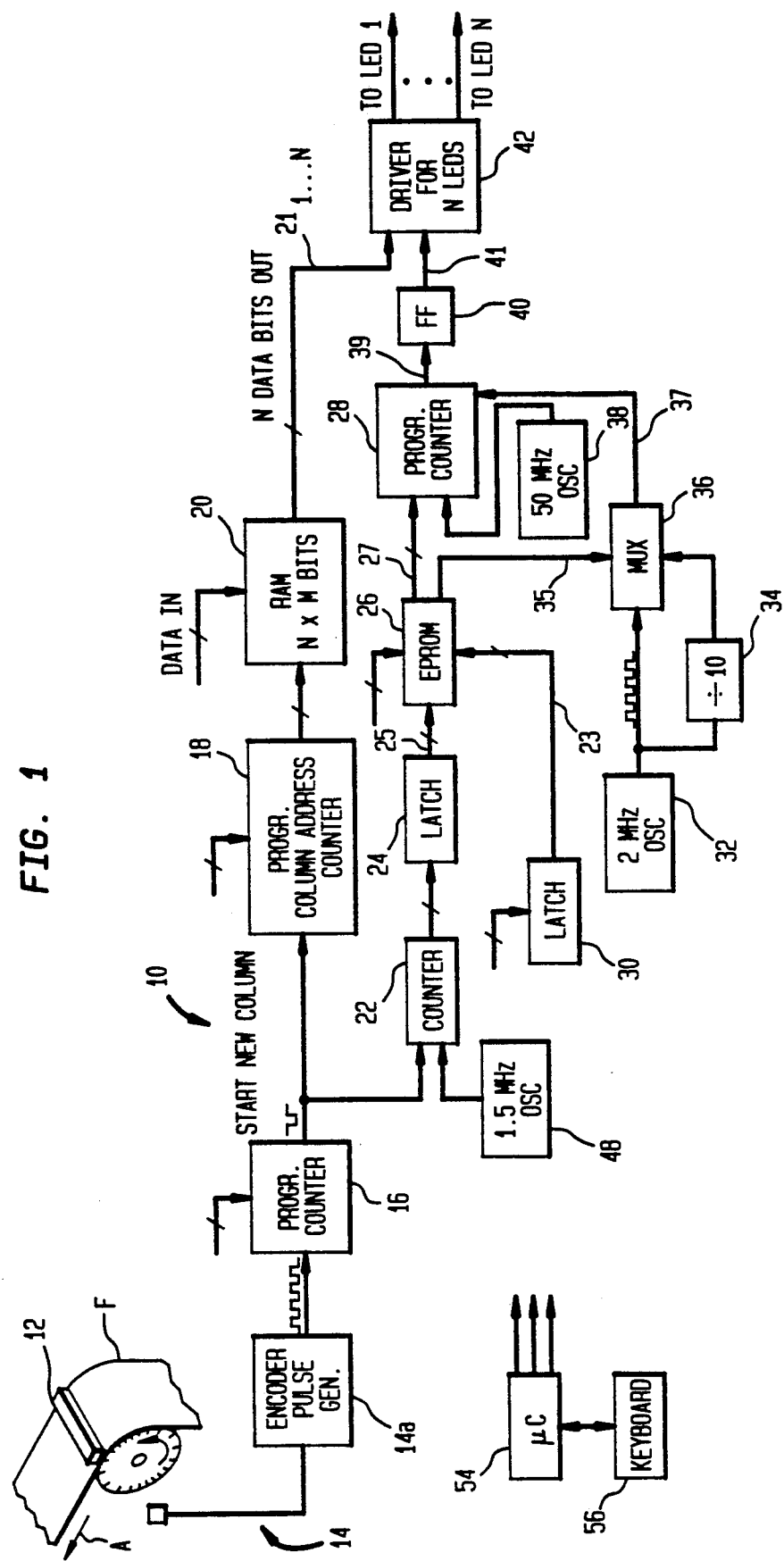
FIG. 1 is a schematic of circuitry forming a part of non-impact printer apparatus made according to the invention.

With reference to FIG. 1, a circuit 10 for controlling a non-impact printer such as an LED printhead is illustrated. As may be seen in the sketch, a recording medium such as a web, F, of photographic film is driven by suitable known means so as to advance past a printhead 12 comprised of a series of LEDs arranged in a line that is transverse and preferably perpendicular to the direction of movement of the web. Although not shown it is well known to focus light from the LEDs using a suitable lens or to otherwise provide optical fibers for transmitting light where the LEDs are spaced some distance from the recording medium. Incremental displacement of the web F is detected by an encoder 14 that may be associated with a roller over which the web F is transported. Suitable known encoders are described in U.S. Pat. No. 4,806,965, the pertinent contents of which are incorporated herein by this reference. A series of relatively short duration pulses are thus developed whose pitches between adjacent pulses represent small increments of web displacement. These pulses are processed and smoothed in an encoder pulse generator 14a and input to a programmable counter 16. Counter 16 is a 12-bit counter that includes a latch that stores a preprogrammed number received from a microcomputer controller 54. The encoder pulses are counted by the counter 16 and upon reaching of the preprogrammed number of counted encoder pulses, a "start new column" pulse is generated by the counter 16. The counter 16 is then reset and commences to count all over again. The "start new column" pulse is used as a synchronizing signal to synchronize the following circuit elements for printing of a single line or column of pixels by printhead 12 in the mainscan direction.

Data to be printed by printhead 12 is stored in a dual port read-write memory or RAM 20. Assuming there are "N" number of recording elements arranged in said printhead, with N=32 or 64 being typical, the "N" bits of data required for forming the column of pixels are accessed in RAM 20 by a programmable address counter 18. Data from a microcomputer 54 is programmed into the RAM 20 in message units of "M" columns long so that the RAM stores N×M bits of data at the beginning of a print job. The number "M" is also input by a signal from microcomputer 54 to programmable counter 18 to form its preprogrammed column start count. For each "start new column" pulse, the address output from address counter 18 is generated and input to RAM 20. In response to this new address, a new N bits of data is output in parallel from the RAM 20 to a driver circuit 42 for driving the LEDs on a printhead 12. This data represents the data to be printed for the next column of pixels to be exposed by printhead 12. While a column of pixels is referred to, it will be understood that in such column the data to be printed for that column will provide that not all LEDs are necessarily energized or illuminated. For example the N×M bits of data may represent a string of characters to be printed with each column of data representing a portion of one character.

The "start new column" pulse is also input to a counter 22 to reset same and cause this counter to commence counting clock pulses from a 1.5 MHz oscillator.

In the course of resetting the counter 22, the counter 22 has output its prior count to a latch 24. This prior count represents the count of 1.5 MHz clock pulses that were counted between the prior "start new column" pulse and the current "start new column" pulse. As such, the 8-bit count output of counter 22 is stored in latch 24 and represents a value related to web speed because it is obtained by determining the time that the web took to go a fixed distance of one column width. The count value in latch 24 is output to one 8-bit address input of an EPROM or programmable ROM 26. A second 8-bit address input is provided by programmable latch 30, which receives an 8-bit address from microcomputer 54. The 8-bit value stored in latch 30 represents a desired exposure time $T_{EXP}$ that each LED will be energized for exposing the film to form a latent image of a single pixel. It will be understood, however, that each pixel to be formed by an LED is formed through plural very rapid energization periods of the LED so that the time $T_{EXP}$ consists of the sum of these smaller energization periods or sub-pixel exposure periods $t_{exp}$ during a pixel recording period between two "start new colums" pulses. Thus, one input from latch 24 to EPROM 26 provides an 8-bit signal having a value related to web speed while a second 8-bit signal to EPROM 26 provides a signal having a value related related to desired exposure for a pixel. The EPROM is programmed in response to its address inputs to output an appropriate 7-bit signal on line 27 that has a value that represents a sub-pixel "on" time exposure period. This 7-bit signal is input to a programmable counter 28 to establish a count represented by this 7-bit signal in down counter 28.

Figure 3:
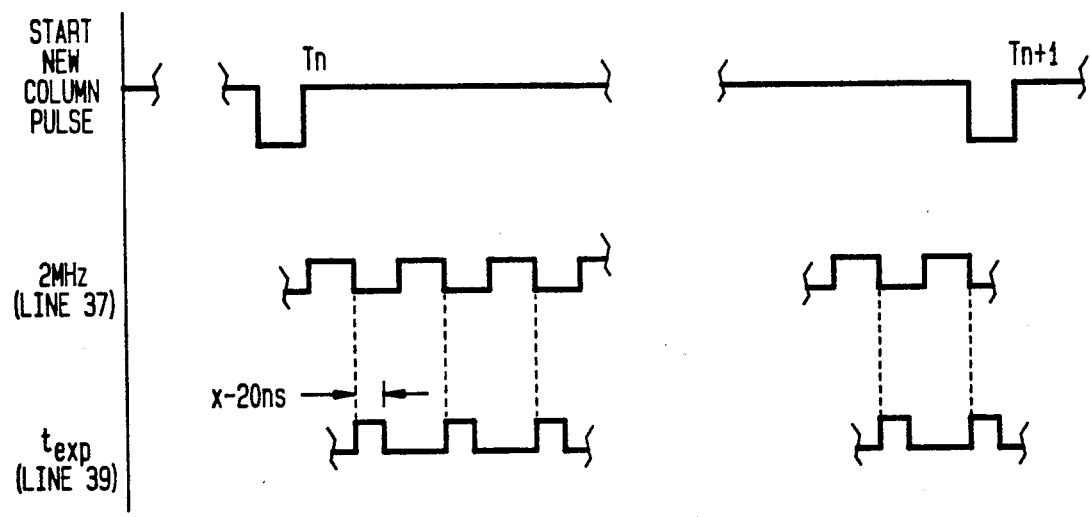
FIG. 3 is a sketch of a timing diagram illustrating the timing of signals and illustrated for purposes of facilitating understanding of the circuitry of FIG. 1.

Counter 28 responds at its clock input to clock signals from a 50 MHz oscillator 38. The time period for counting these 50 MHz clock signals down from the 7-bit count to zero represents a sub-pixel exposure time period. As may be seen in FIG. 3, a sub-pixel exposure period $t_{exp}$ is an interval defined by x number of 20 nanoseconds (ns.) periods where x represents the starting count provided over line 27 to counter 28 and 20 ns. is the duration of a clock pulse at frequency 50 MHz. As shown in FIG. 3, the sub-pixel exposure time period, $t_{exp}$, exists between adjacent fall and rise transitions of a 2 MHz clock pulse train. This latter clock pulse train is generated by a 2 MHz oscillator 32 and input to a multiplexer 36. The output of oscillator 32 is also input to the input of a divide-by-ten circuit 34 which thereby generates a 200 kHz clock pulse train that is one-tenth the frequency of oscillator 32. The output of the divide-by-ten circuit 34 is also input to multiplexer 36. A single bit is output over line 35 of the EPROM 26 which determines which of the two clock pulse trains, 2 MHz or 200 kHz is to be output over line 37 which is coupled to a reset terminal of the counter 28 and which, upon a downward transition of the 2 MHz or 200 kHz pulse train, resets the count in the counter 28 to the programmed start count provided on line 27.

Figure 2:
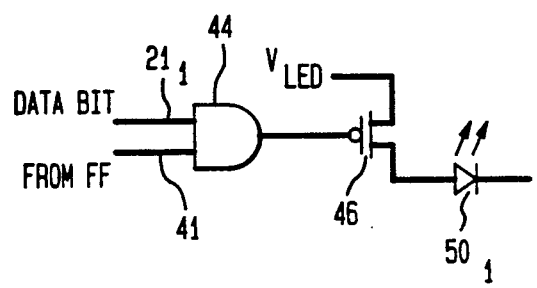
FIG. 2 is a schematic of a driver circuitry for driving one recording element and forming a part of the circuitry of FIG. 1.

Upon resetting of the counter 28, a signal at the output thereof on line 39 sets a flip-flop 40 to a logic level high over line 41 which is input to a driver circuit 42 for providing driving current to the LEDs for a sub-pixel exposure time period $t_{exp}$. With reference to FIG. 2, a schematic of a circuit for providing driving current to a single LED $50_1$ is shown, it being understood that this is replicated for each of the additional LEDs ($50_2 \ldots 50_n$) driven by driver circuit 42. In the circuit of FIG. 2 an AND logic gate 44 has at one of its inputs a connection to line $21_1$ that carries a signal of a data bit that was output from RAM 20. This data bit is a binary bit that is of a suitable logic level to determine whether or not a pixel is to be printed at this column location by this LED. At the other input of AND gate 4 there is connected line 41 providing a timing signal from the output of flip-flop 40. The signal on line 41 as shown in FIG. 3 represents a series of pulses each having a duration of X times 20 nanoseconds and represents an interval for recording a sub-pixel, assuming that a suitable logic high level data signal is present on line $21_1$. The summation of the sub-intervals of time $t_{exp}$ between adjacent "start new column pulses" represents the exposure time $T_{EXP}$ for recording a pixel. In response to the next "start new column" pulse, the operation repeats of providing a new data signal to the data input lines $21_1, 21_2 \ldots 21_N$ to each of the logic AND circuits associated with a respective LED. During the periods when the logic levels on lines 21, and 41, are logic level high a transistor 46 is enabled and current flows to $LED_1$.

The operation may be better understood in considering the following example.

Assume the web 12 is advancing at a speed of 40 inches per second and that a desired column width in the direction of web movement, i.e., sub-scanning direction is 0.003 inches. The time between "start new column" pulses, i.e., between $T_n$ and $T_{n+1}$ in FIG. 3 is 0.003 inches divided by 40 inches per second or $75 \times 10^{-6}$ seconds. Thus, the count counted by counter 22 for the last period which ended when $T_n$ was generated is about 113. That is, about 113 1.5 MHz pulses might be counted by counter 22 and stored in latch 54. The sub-pixel "on" time is then determined by addressing EPROM 26 with the value 113 on address line 25 and with the pixel exposure time value 20 (for 20 microseconds) programmed into latch 30 by microcomputer 54. The output on line 27 from EPROM 26 with these inputs is programmed to be 7. This number X=7 represents seven 20 nanosecond clock periods of clock 38 as the exposure time $t_{exp}$ for each sub-pixel between Tn and $T_{n+1}$. The values in EPROM memory 26 have been calculated using the following equation:

$$X = \frac{D}{N_{1.5} \times \frac{F_{2.0}}{F_{1.5}} \times \frac{1}{F_{50}}}$$

where D is the desired exposure time for a pixel and is input via keyboard 56 to microcomputer 54 and is based on experimental results taking into account LED brightness and film sensitivity for the wavelength of light from the LEDs. $N_{1.5}$ is the number of 1.5 MHz clock pulses counted by counter 22 between the period $T_{n-1}$ and $T_n$ and is thus a value substantially related to current film speed; and $F_{2.0}$, $F_{1.5}$ and $F_{50}$ are the frequencies of oscillators 32, 48 and 38, respectively. Memory 26 may also be of the type of memory that may be reprogrammed by microcomputer 54 for each new desired exposure time D for a pixel. This allows for changes in density of pixels without changing data. It also provides for flexibility in the event that LED brightness changes or where different films having different sensitivities to light from the LEDs are to be used. The number of sub-pixel exposures that will be made during the period between $T_n$ and $T_{n+1}$ is determined by the 2MHz oscillator as it determines the pitch spacing between the times when new sub-pixel exposures begin by initiating counting by counter 28. The number of sub-pixel exposures will also change with the speed of the web since this number will depend upon the time between adjacent "start new column" pulses.

As film speed may vary greatly from a nominal speed, particularly during startup or slow down of the drive to the film, the circuitry can accommodate significantly slower speeds of the film by employing the 200 kHz clock pulses generated by the divide by 10 circuit 34. As noted above, EPROM 26 generates a one bit signal to control whether multiplexer 36 outputs the 2 MHz or 200 kHz clock signals. The EPROM may be programmed such that for web speeds below a threshold say 40 inches/second that the 200 kHz clock pulses are passed and for web speeds equal or greater than 40 inches/second that the 2 MHz clock pulses are passed by multiplexer 36. As noted above web speed is determined by the number of 1.5 MHZ clock pulses counted during a column period by counter 22. The EPROM will be programmed according to the formula indicated above and it will be appreciated that $F_{2.0}$ is replaced by $F_{200k}$, the frequency of the 200 kHz clock.

Modifications to the invention may include the use of serial output of data from RAM 20 and storage of data in latches. In addition it is also well known to provide staggered lines of LEDs to increase the recording resolution. The timing for exposure of each line of LEDs may be adjusted so that together they are capable of recording a single column of LEDs with higher resolution. In addition the LEDs may provide output in different colors and colored images may be formed on color film by exposing the same pixel location to light from different colored LEDs either simultaneously or successively.

In spreading a pixel exposure over the period between "start new column" pulses, gaps between adjacent pixels in the direction of movement of the recording medium are thereby minimized. In addition, LEDs being lambertian emitters tend to provide an exposure whose contrast varies over the area of the pixel. The use of closely spaced in time sub-pixel exposures in forming a pixel provides overlap of the sub-pixel exposures and thereby provides a more uniform density over the area of the pixel. In addition, by providing a circuit that is capable of both adjusting the number of sub-pixel recording intervals for recording of a pixel and the duration for recording of each sub-pixel a broader range of variation of speeds of the recording medium may be handled by the printer recording apparatus and method described herein. However, the invention in its broader aspects contemplates adjusting of either number of sub-pixels intervals or duration of sub-pixel intervals.

The invention has been described in detail with particular reference to preferred embodiments thereof, but it will be understood that variations and modifications can be effected within the spirit and scope of the invention.

What is claimed is:

1. A non-impact printer apparatus for recording on a moving recording medium, which apparatus comprises:
    a plurality of recording elements;
    first means for generating a first signal having information representing a speed of movement of the recording medium;
    second means for generating an image data signal representing a pixel to be recorded by one of said plural recording elements during a pixel recording period;
    third means, responsive to said first signal, for generating a plural number of first pulses used to enable the said one recording element during recording of the pixel; and
    fourth means, responsive to said first pulses and said image data signal, for energizing the said one recording element to record the pixel in a series of spaced sub-pixel recording periods with a duration of one of said sub-pixel recording periods being dependent upon the information in said first signal; and
    wherein said first means includes
    (a) fifth means for generating a series of second signals representing equal increments in displacement of the recording medium;
    (b) sixth means for counting said second signals to generate third signals, each third signal providing synchronization for recording a new column of pixels by the recording elements;
    (c) seventh means for providing a series of second pulses at a first predetermined clock frequency; and
    (d) eighth means responsive to each third signal for counting said second pulses to generate said first signal as a count of a number of second pulses counted between two adjacent third signals.

2. The apparatus of claim 1 and wherein said third means includes a ninth means, that is responsive to said first signal and to a fourth signal having information related to a predetermined exposure time for recording a pixel, for generating a fifth signal defining a second number representing a count value related to a duration of one of said sub-pixel recording periods.

3. The apparatus of claim 2 and wherein said third means also includes a programmable counter means for storing said count value, and said third means also includes tenth means for generating a series of third pulses at a second predetermined clock frequency that is higher than said first clock frequency, said programmable counter means counting said second number of third pulses and outputting a sixth signal to indicate counting of said second number of third pulses.

4. The apparatus of claim 3 and said third means also includes eleventh means responsive to said sixth signal for generating said first pulses.

5. A method for non-impact recording on a moving recording medium, said method comprising the steps of:
    (a) generating a first signal having information representing a speed of movement of the recording medium and a second signal representing image data for a pixel to be recorded;
    (b) driving a recording element for recording said pixel on the recording medium by energizing the recording element to record during a plural number of spaced sub-pixel exposure periods, a duration of a sub-pixel recording period being related to said first signal and wherein the number of said sub-pixel recording periods for recording of said pixel is dependent upon the speed of movement of the recording medium.

6. The method of claim 5 wherein the first signal is a multibit digital signal having a value related to the speed of movement of the recording medium.

7. An apparatus for non-impact recording on a moving recording medium, said apparatus comprising:
    a recording element;
    first means for generating a first signal having information representing a speed of movement of the recording medium;
    second means for generating a second signal representing image data for a pixel to be recorded;

third means for driving a recording element for recording said pixel on the recording medium by energizing the recording element to record during a plural number of spaced sub-pixel exposure periods with a duration of a sub-pixel recording period being related to said first signal and wherein the number of said sub-pixel recording periods for recording of said pixel is dependent upon the speed of movement of the recording medium.

8. A non-impact printer apparatus for recording on a moving recording medium, which apparatus comprises:
a recording element;
first means for generating a first signal having information representing a speed of movement of the recording medium;
second means for generating an image data signal representing a pixel to be recorded during a pixel recording period;
third means, responsive to said first signal, for generating a plural number of first pulses used to enable the recording element during recording of the pixel; and
fourth means, responsive to said first pulses and said image data signal, for energizing the recording element to record the pixel in a series of spaced sub-pixel recording periods with a duration of one of said sub-pixel recording periods being dependent upon the information in said first signal and
wherein said third means includes fifth means for determining a number of sub-pixel recording periods during the period for recording of a pixel, the number of sub-pixel recording periods being automatically adjusted in accordance with speed of movement of the medium.

* * * * *